United States Patent
Robrecht et al.

(10) Patent No.: US 9,203,220 B2
(45) Date of Patent: Dec. 1, 2015

(54) INSTALLATION ASSEMBLY FOR BRIDGING A CABLE HARNESS OR THE LIKE BETWEEN TWO AIRCRAFT STRUCTURE ELEMENTS

(71) Applicant: Airbus Operations GmbH, Hamburg (DE)

(72) Inventors: Volker Robrecht, Hamburg (DE); Till Raguse, Hamburg (DE); Daniel Stoevesand, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1 day.

(21) Appl. No.: 14/244,931

(22) Filed: Apr. 4, 2014

(65) Prior Publication Data
US 2014/0299720 A1 Oct. 9, 2014

(30) Foreign Application Priority Data

Apr. 5, 2013 (EP) ..................................... 13162545

(51) Int. Cl.
| | |
|---|---|
| *H02G 3/00* | (2006.01) |
| *B60R 16/00* | (2006.01) |
| *F16L 3/22* | (2006.01) |
| *B60R 16/02* | (2006.01) |

(Continued)

(52) U.S. Cl.
CPC ........ *H02G 3/00* (2013.01); *B60R 16/02* (2013.01); *H02G 3/32* (2013.01); *H02G 3/36* (2013.01); *H02G 3/38* (2013.01)

(58) Field of Classification Search
CPC ............. H02G 3/00; H02G 3/30; H02G 3/32; H02G 3/36; H02G 3/38; B60R 16/0222

USPC ............. 248/200.1, 68.1, 73, 4.2–74.47; 244/129.1, 131, 110 C; 174/72 A, 73.1, 174/74 R; 24/470, 455

See application file for complete search history.

(56) References Cited

U.S. PATENT DOCUMENTS

| | | | |
|---|---|---|---|
| 4,068,966 A * | 1/1978 | Johnson et al. ............... | 403/397 |
| 6,500,666 B1 * | 12/2002 | Clements-Macak et al. ......................... | 435/303.3 |

(Continued)

FOREIGN PATENT DOCUMENTS

| | | |
|---|---|---|
| DE | 10122344 C1 | 6/2002 |
| DE | 102010021836 A1 | 12/2011 |

OTHER PUBLICATIONS

European Patent Office, Extended European Search Report for EP13162545.1, Mailed Jul. 17, 2013.

*Primary Examiner* — Tan Le
(74) *Attorney, Agent, or Firm* — Ingrassia Fisher & Lorenz, P.C.

(57) ABSTRACT

An installation assembly for bridging a cable harness between two aircraft structure elements of an aircraft is provided. The installation assembly includes an elongated connecting rod having two end sections for attaching the connecting rod onto two adjacent aircraft structure elements, at least one cable guidance element having at least one receiving section for receiving a cable harness and an attachment section for circumferentially surrounding the connecting rod. Locking means are provided to form a connection between the attachment section and the connecting rod, wherein a polygonal cross section of the connecting rod corresponds to a recess of the attachment section in order to form a positive locking engagement between the cable guidance element and the connecting rod.

16 Claims, 1 Drawing Sheet

(51) Int. Cl.
  *H02G 3/32* (2006.01)
  *H02G 3/38* (2006.01)
  *H02G 3/36* (2006.01)

(56) References Cited

U.S. PATENT DOCUMENTS 6,632,994 B1    10/2003  Mangone, Jr.
8,240,620 B2 *   8/2012  Walter .......................... 248/68.1
8,590,846 B2    11/2013  Guthke et al.
2008/0148535 A1 *  6/2008  Santin et al. .................... 24/470
2010/0294896 A1 * 11/2010  Sayilgan ......................... 248/73
2010/0301177 A1 * 12/2010  Guthke et al. ............... 248/68.1
2012/0160962 A1 *  6/2012  Holvoet et al. ................ 244/131
2014/0060891 A1 *  3/2014  Deshaies et al. .......... 174/163 R

* cited by examiner

INSTALLATION ASSEMBLY FOR BRIDGING A CABLE HARNESS OR THE LIKE BETWEEN TWO AIRCRAFT STRUCTURE ELEMENTS

CROSS-REFERENCE TO RELATED APPLICATION

This application claims priority to European Patent Application No. 13 162 545.1, filed Apr. 5, 2013, which is incorporated herein by reference in its entirety.

TECHNICAL FIELD

The technical field relates to an installation assembly for bridging a cable harness between two aircraft structure elements of an aircraft, the assembly comprising an elongated connecting rod having two end sections for attaching the connecting rod onto two adjacent aircraft structure elements, at least one cable guidance element having a receiving section for receiving a cable harness and an attachment section for circumferentially surrounding the connecting rod, wherein locking means are provided to form a connection between the attachment section and the connecting rod.

In addition, the technical field relates to the construction of commercial aircraft for the transport of passengers and cargo. In general, the related application of the present disclosure is the installation of flexible systems, for example electrical systems for nautic, aeronautic or automotive industry. Especially, within the fuselage of a large-bodied aircraft there are pipelines and electrical cable harnesses that are of particular interest in the context of the present disclosure. Such cable harnesses or the like comprise electrical voltage supply lines or control lines which form parts of electrical bus systems for aircraft internal communication of electrical devices. The cable harnesses used for this purpose comprise bundles of individual insulated metal wires or stranded metal wires which bundles are up to several centimeters in diameter. Most of the time the cable harness comprise separate external insulation for protection against mechanical and climatic influences. When viewed from the interior of the cabin, the cable harnesses are laid between the other aircraft surface and the interior of the cabin so as to be out of sight. This is the region of the aircraft structure that comprises various re-enforcements members and frame elements, which aircraft structure, as a rule, comprises openings for feeding the harnesses through in order to lay said harnesses along the aircraft fuselage.

BACKGROUND

From the generally known state of the art a bar-shaped bridging assembly for bridging a cable harness or the like is known which additionally guides the cable harness in a region between two beams of the aircraft structure. Usually such an installation assembly comprises several individual cable guiding elements with a conventional receiving section for the cable harness; however, on the attachment section a receiving recess for the end of an elongated connecting rod for bridging the aircraft structure is provided. By stringing together individual cable guiding elements with connecting rods a large distance between beams of the aircraft structure may safely be bridged and the cable harness is reliably guided in this region. This installation assembly is affixed to beams of the aircraft structure by way of the two connecting rods situated on the outside, for example by means of a screw-connection arrangement.

The known installation assembly for laying cable harness is associated with a disadvantage in that involves very considerable installation expenditure. This is because the individual cable guiding elements are usually bonded to the ends of the associated connection rods. Bonding requires sufficient time for curing which increases production-related expenditure. Furthermore, additional installation elements are required in order to affix the connecting rods including the cable guiding elements during the curing period in the desired position. Moreover, on the known bounding solution there is a risk of undesirable chafing points forming as a result of cured adhesive residues in the region of the connecting point towards the cable harness.

DE 10 2009 022 796 A1 describes another technical solution for bridging a cable harness or the like between two aircraft structure elements. In order to install a cable harness or the like in a simple manner and involving little expenditure of time while insuring safe affixation of the cable harness the solution proposes an installation assembly comprising a connecting rod and a cable guiding element, which is designed in the manner of a clip connection comprising at least one resiliently held radially directed locking pin and a corresponding radial snap-in hole which together establish a positive-locking engagement.

In addition, other objects, desirable features and characteristics will become apparent from the subsequent summary and detailed description, and the appended claims, taken in conjunction with the accompanying drawings and this background.

SUMMARY

According to various teachings of the present disclosure, provided is an installation assembly for bridging a cable harness or the like between two aircraft structure elements of an aircraft which installation assembly may be installed in a fast and simple manner.

The present disclosure encompasses the technical teaching according to which a polygonal cross section of the connecting rod corresponds to a recess of the attachment section of the cable guidance element in order to form a positive-locking engagement between the cable guidance elements and the connecting rod.

Due to the fact that the connecting rod is not divided in several parts assembled together via the different cable guidance elements, the installation assembly is more stable than prior art solutions. The polygonal cross sections of the connection rod allows a flexible affixation of cable guiding elements along the connecting rod on desired positions in lateral direction as well as in different angle positions on the connecting rod.

Generally, the recess of the attachment section is provided with a substantially U-shaped form which corresponds to a clip element snapped in the opening of the substantially U-shaped recess in order to form an easy to mount clip connection.

In order to form a safe connection several barbed hooks are moulded on opposite flanks of the clip element. The said barbed hooks avoid a self-loosening of the mounted clip connection. According to one embodiment the polygonal cross section of the connecting rod is an octagon. Due to the octagonal cross section it is possible to radially mount the cable guidance element onto the connecting rod in about 45° angle steps in order to arrange cable guidance elements on desired positions in relation to the connecting rod. According to one embodiment the installation assembly consists of the connecting rod and cable guidance elements parts which may be manufactured as injection molding parts. With these two parts a lot of different variants may be created without complex manufacturing steps.

According to one embodiment, the end section for attaching the connecting rod onto two adjacent aircraft structure elements is formed as an eyelet section for screwing onto the aircraft structure.

The receiving section of the cable guidance element for receiving a cable harness or the like has a substantially V-shaped cross section so as to ensure centering contact of the cable harness. The cable harness may easily be attached to the guidance element via a cable strap.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
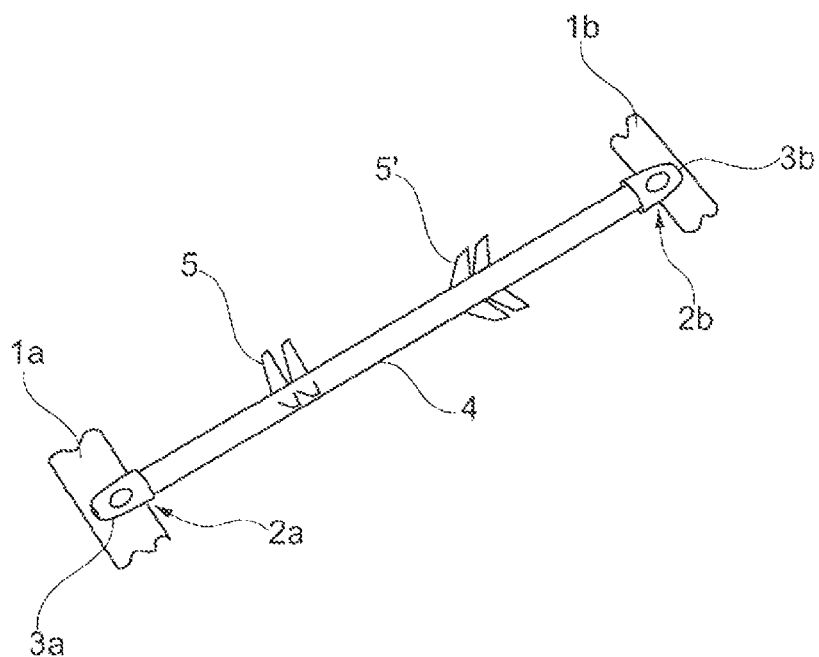
FIG. 1 is a perspective view of an installation assembly for bridging a cable harness between two aircraft structure elements.

According to FIG. 1 the installation assembly is mounted with its end onto adjacent aircraft structure elements 1a and 1b comprising to beams that are spaced apart from each other and extend parallel to each other.

In order to attach both end sections 2a and 2b of the installation assembly onto the aircraft structure elements 1a and 1b eyelet openings 3a and 3b respectively are provided.

The installation assembly comprises two cable guidance elements 5 and 5' which are attached to an elongated connecting rod 4 for bridging the (not shown) cable harness between the said two aircraft structure elements 1a and 1b.

Figure 2:
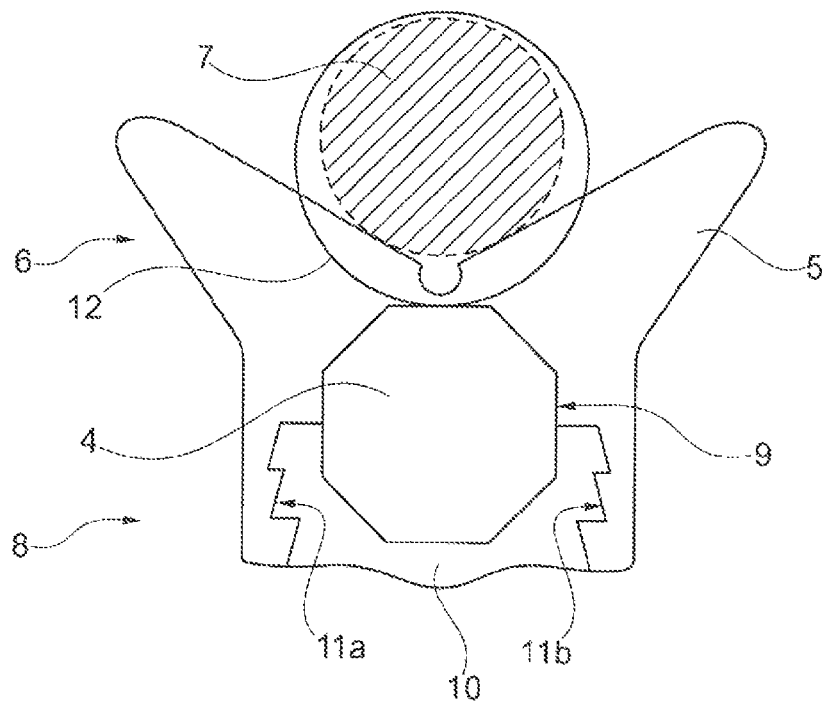
FIG. 2 is a cross sectional view of a cable guidance element with a cable harness and attached to a connecting rod of the installation assembly.

According to FIG. 2 the cable guidance element 5 comprises a receiving section 6 for receiving the cable harness 7 and an attachment section 8 for circumferentially connecting rod 4.

The polygonal cross section of the connecting rod 4 corresponds to a recess 9 of the attachment section 8 forming a positive locking engagement between the cable guidance elements 5 and the connecting rod 4. The recess 9 of the attachment section 8 is provided with a substantially U-shaped form and corresponds to a clip element 10 which is snapped in the opening of the substantially U-shaped recess 9 in order to form a clip connection.

In order to avoid a self-loosening of the said clip connection several barbed hooks are provided on opposite flanks 11a and 11b of the clip element 10. The clip element 10 is also provided with substantially U-shaped cross section.

The receiving section 6 of the cable guidance element 5 has a substantially V-shaped cross section for receiving the cable harness 7. The cable harness 7 is attached to the receiving section 6 by a cable strap 12.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An installation assembly for bridging a cable harness between two aircraft structure elements of an aircraft, the installation assembly comprising:
   an elongated connecting rod having two end sections for attaching the connecting rod onto two adjacent aircraft structure elements; and
   at least one cable guidance element having at least one receiving section for receiving a cable harness and an attachment section for circumferentially surrounding the connecting rod, wherein locking means are provided to form a connection between the attachment section and the connecting rod,
   wherein a polygonal cross section of the connecting rod corresponds to a recess of the attachment section in order to form a positive locking engagement between the at least one cable guidance element and the connecting rod, and
   wherein the U-shaped recess corresponds to a clip element snapped in the opening of the U-shaped recess in order to form a clip connection.

2. The installation assembly according to claim 1, wherein the recess of the attachment section is provided with a U-shaped form.

3. The installation assembly according to claim 2, wherein on opposite flanks of the clip element one or more barbed hooks are provided in order to avoid a self-loosening of the clip connection.

4. The installation assembly according to claim 1, wherein the clip element is provided with a U-shaped cross section.

5. The installation assembly according to claim 1, wherein the polygonal cross section of the connecting rod is an octagon.

6. The installation assembly according to claim 1, wherein the connecting rod and the at least one cable guidance element are made from plastics material by injection molding.

7. The installation assembly according to claim 1, wherein the end section for attaching the connecting rod onto two adjacent aircraft structure elements is formed as an eyelet opening.

8. The installation assembly according to claim 1, wherein the at least one receiving section of the at least one cable guidance element for receiving a cable harness has a V-shaped cross section.

9. An aircraft, comprising:

two aircraft structure elements;

an installation assembly for bridging a cable harness between the two aircraft structure elements, the installation assembly including:

an elongated connecting rod having two end sections for attaching the connecting rod onto two adjacent aircraft structure elements; and at least one cable guidance element having at least one receiving section for receiving a cable harness and an attachment section for circumferentially surrounding the connecting rod, wherein locking means are provided to form a connection between the attachment section and the connecting rod, wherein a polygonal cross section of the connecting rod corresponds to a recess of the attachment section in order to form a positive locking engagement between the at least one cable guidance element and the connecting rod, and wherein the U-shaped recess corresponds to a clip element snapped in the opening of the U-shaped recess in order to form a clip connection.

10. The aircraft of claim 9, wherein the two aircraft structure elements extend parallel to each other.

11. The aircraft of claim 9, wherein the recess of the attachment section is provided with a U-shaped form.

12. The aircraft of claim 11, wherein on opposite flanks of the clip element one or more barbed hooks are provided in order to avoid a self-loosening of the clip connection.

13. The aircraft of claim 9, wherein the clip element is provided with a U-shaped cross section.

14. The aircraft of claim 9, wherein the polygonal cross section of the connecting rod is an octagon.

15. The aircraft of claim 9, wherein the end section for attaching the connecting rod onto two adjacent aircraft structure elements is formed as an eyelet opening.

16. The aircraft of claim 9, wherein the at least one receiving section of the at least one cable guidance element for receiving a cable harness has a V-shaped cross section.

\* \* \* \* \*